UNITED STATES PATENT OFFICE.

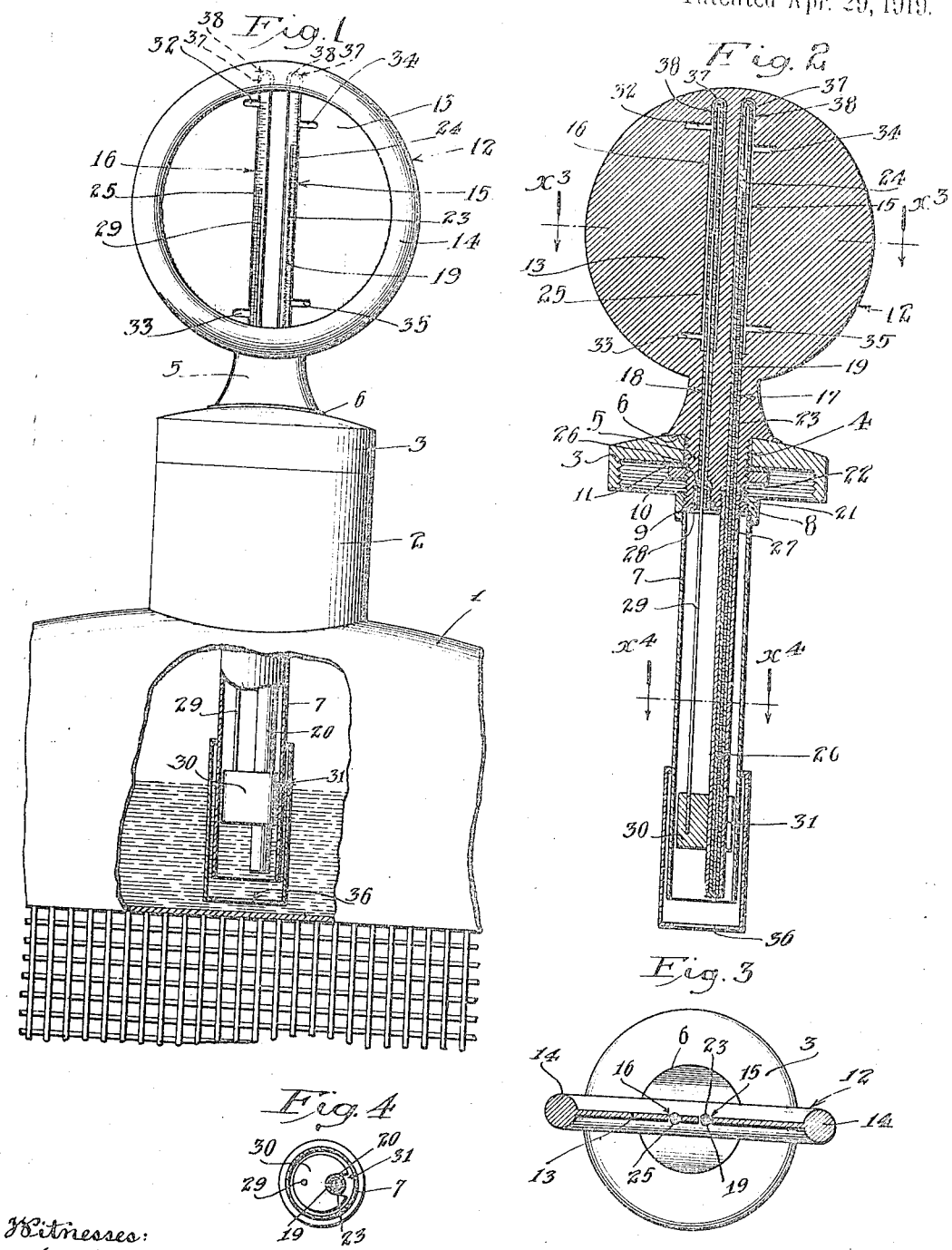

WILLIAM DANIAL COLLINS, OF CAZENOVIA, NEW YORK, ASSIGNOR OF ONE-HALF TO GEORGE W. H. ALLEN, OF CAZENOVIA, NEW YORK.

COMBINED LIQUID-GAGE AND TEMPERATURE-INDICATOR.

1,301,910.  Specification of Letters Patent.  Patented Apr. 29, 1919.

Application filed June 11, 1918. Serial No. 239,442.

*To all whom it may concern:*

Be it known that I, WILLIAM D. COLLINS, a citizen of the United States, residing at Cazenovia, county of Madison, and State of New York, have invented a new and useful Combined Liquid-Gage and Temperature-Indicator, of which the following is a specification.

This invention pertains to devices of the character designed to indicate to an observer the level at which water stands in a container and also the temperature of said liquid. The device is used to advantage in connection with the radiator of an automobile or flying machine engine for informing the operator as to the volume and temperature of the radiator water.

An object of the invention is to combine in one instrument means for indicating the level of the water in a radiator and also the temperature of said water.

Another object is to produce a device of this character of comparative simplicity combined with accuracy and ease with which it may be read.

I am aware that it is not new to provide a thermometer on radiators or to provide a level indicator for the water, but heretofore these different devices have been used separately, one being used on some radiators and the other being used on other radiators. A mere change of temperature of the water in the radiator will not cause the thermometer placed therein to indicate to the operator whether the water level is low or high in the radiator. Also the radiator may be full and yet the temperature may go higher than the degree advisable for operation of the engine.

Another object is to so construct the device that the thermometer will extend downward substantially to the tubes of the radiator so as to be immersed in the water when the water level is above the upper ends of the radiator tubes.

Other objects and advantages will appear in the subjoined detailed description.

The accompanying drawings illustrate the invention:

Figure 1 is a side elevation of the invention installed in place on a radiator, a portion of which is broken away to disclose the lower end of the indicator.

Fig. 2 is a vertical midsection taken on a plane normal to the direction of sight in looking at Fig. 1.

Fig. 3 is a plan section on line $x^3$—$x^3$, Fig. 2.

Fig. 4 is a plan section on line $x^4$—$x^4$, Fig. 2.

A radiator is indicated at 1 and is not a part of the invention but is merely shown to make clear how the indicator is mounted thereon. Said radiator 1 is provided with the usual filling neck 2 which is adapted to be normally closed by a cap 3 which only differs from the ordinary cap in general use by reason of it having an orifice 4 therethrough.

In the orifice 4 is inserted a shouldered stem 5, the shoulder being indicated at 6 and said shoulder being adapted to engage the outer face of the cap 3 so as to limit inward movement of the stem 5. Connected by suitable means to the inner end of the stem 5 is a tubular housing 7. In the instance shown in the drawing the housing 7 is connected to the stem 5 by a union 8 and packing 9 is provided in the union adapted to seat against the inner end of the stem 5. This packing 9 is not absolutely necessary and may be omitted if desired.

Screw-threaded onto the stem 5 between the union 8 and the cap 3 is a nut 10 adapted to hold the stem 5 against outward movement relative to the cap 3. A washer 11 may be inserted between the nut 10 and the inner face of the cap 3 if desired, but such washer is not absolutely essential and may be omitted if desired. Thus it is seen that the shoulder 6 and nut 10 hold the stem 5 in place on the cap 3.

The stem 5 connects the cap 3 with a shield 12 of any suitable construction. In the drawings the shield 12 is of circular construction and comprises a relatively thin flat plate 13 surrounded at its periphery by a thicker rim 14 of substantially circular cross-section. In the drawings the plate 13 and rim 14 are shown as formed integral with one another.

The shield 12 is provided with vertically extending slots 15, 16 parallel with one another and communicating at their lower ends with holes 17, 18, respectively, which extend downward through the stem 5 and open through the inner end of said stem. Extending through the hole 17 and throughout the length of the slot 15 is a transparent tube 19 of suitable material, such as glass, and said tube extends downward to the lower end of the housing 7. Surrounding that portion of the tube 19 that is within the housing 7 is a tubular casing 20 which may be in the form of a metal tube. The casing 20 is screw-threaded at its upper end into an enlarged portion 21 of the hole 17, there being packing 22 in the enlarged hole 21 so that when the casing 20 is screwed up against the packing it compresses the same closely around and in contact with the tube 19 to hold the tube. Thus in effect the upper end of the casing 20 forms a stuffing box gland, the stuffing box itself being formed by the lower end of the stem 5. The tube 19 forms a thermometer tube and may be filled with any suitable expansible temperature-indicating agent 23 for indicating change of temperature. The agent 23 may be colored if desired so as to be clearly seen or a colored float may be employed. Preferably the agent will be mercury and the float may be in the form of a colored rod 24.

Extending through the hole 18 and throughout the length of the slot 16 is a transparent tube 25 which may be made of glass or the like and said tube 25 extends to the inner end of the stem 5 where it is suitably packed by packing 26 in an enlarged portion 27 of the hole 18, there being a gland 28 screw-threaded into the enlarged hole portion 27 to hold the packing 26 in place.

Inside of the tube 25 is accommodated the upper end of a level-indicating member in the form of a rod 29 the lower end of which is fastened to a float 30 constructed of any suitable material. In the instance shown in the drawings the float 30 is provided with a vertically extending slot 31 to accommodate the casing 20 which thus forms a guide for the float to keep the rod 29 alined with the hole 18. As the float 30 rises and falls with change of the level of the liquid in the radiator 1, the upper end of the rod 29 can be seen through that portion of the tube 25 that lies within the slot 16. The portions of the tubes 19 and 25 lying within the slots 15, 16 may be graduated as shown in Fig. 1.

For convenience in reading off the full and empty indications of the indicating member 29, horizontal slots 32, 33 are provided in the plate 13, said slots communicating with the slot 16. When the upper end of the rod 29 registers with the slot 32 it indicates that the radiator is full of water and when said end registers with the slot 33 it indicates that the radiator is substantially empty.

To clearly indicate the boiling and freezing points, horizontal slots 34, 35 are provided in the plate 13, said slots communicating with the slot 15. When the upper end of the rod 24 registers with the slot 34 it indicates that the water in the radiator is boiling and when said end of the rod registers with the slot 35 it indicates that the water in the radiator is at the freezing point. Other slots similar to the slots 32 to 35 may be provided to indicate any other desired water levels and temperatures.

Preferably the housing 7 is made in sections which can be adjusted relative to one another so that the lower end of the housing 7 can be adjusted to various levels to suit different radiators. Relatively adjustable sections are shown in the drawings, one section telescoping upon the other. The lower end of the housing 7 is provided with an opening 36 so as to admit water to the housing from the radiator.

It will be clear from the foregoing that when it is desired to put water in the radiator, all that is necessary is to unscrew the cap 3 and remove it thus withdrawing the housing 7 from the radiator. When the radiator is filled the housing 7 will be inserted in the neck 2 of the radiator and the cap 3 screwed onto said neck, with the shield 12 turned with one of its flat faces toward the driver of the vehicle on which the radiator is placed. The driver can readily observe by means of the indicator what the level of the water is in the radiator and also the temperature thereof so as to know when to fill the radiator and when to allow the engine to cool so as not to injure it by driving it when too hot.

It is clear that transmitted light passing through the slots 15, 16 will illuminate the tubes 19 and 25 and that light transmitted through the slots 32 to 35 enables certain water levels and temperatures to be read off very easily from the driver's seat.

The upper ends of the tubes 19, 25 are preferably inserted in resilient caps 37 formed of rubber or other suitable material.

It is desirable that the upper ends of the tubes 19, 25 project into sockets 38 formed in the rim 14 of the shield and the caps 37 are seated in said sockets, thus securely holding the upper ends of the tubes.

It is understood that the inventor reserves the right to make such changes and modifications in the indicator as lie within the spirit and scope of the appended claims.

I claim:

1. A combined gage and temperature indicator comprising a shield, means to fasten the shield to a radiator cap, a housing connected with the shield, a thermometer tube having its upper portion protected by the shield and having its lower portion within the housing, a temperature indicating agent in the tube, a float in the housing, and a liquid gage indicating member fastened at its lower end to the float and having its upper portion protected by the shield, there being two parallel vertical slots extending from face to face of the shield and accommodating the upper ends of the thermometer tube and liquid gage indicating member.

2. A combined gage and temperature indicator comprising a plate having vertical slots, means to connect said plate to a radiator cap, a thermometer tube having its upper portion in one of the slots, a transparent tube in the other slot, a liquid gage-indicating member having its upper portion in said transparent tube, a temperature indicating agent in the thermometer tube, and a float on the lower end of the liquid gage-indicating member.

3. A combined gage and temperature indicator comprising a plate having vertical slots, means to connect said plate to a radiator cap, a thermometer tube having its upper portion in one of the slots, a temperature indicating agent in the thermometer tube, a float in coöperative relation with the other slot, and a liquid gage-indicating member fastened at its lower end to the float and having its upper portion in the space formed by said other slot.

4. A combined gage and temperature indicator comprising a plate having vertical slots therein, transparent tubes extending into the slots, means to mount the plate on the cap of a radiator, a temperature indicating agent in one of the tubes, a liquid gage-indicating member having its upper portion in the other tube, and a float on the lower end of the liquid gage-indicating member.

5. A combined gage and temperature indicator comprising a stem having vertically extending holes, a thermometer tube extending through one of the holes and projecting below the lower end of the stem, a temperature-indicating agent in the thermometer tube, a liquid gage-indicating member extending through the other hole and projecting below the lower end of the stem, means to fasten the stem to a radiator cap, a float on the lower end of the liquid gage-indicating member, the thermometer tube extending below the level of the float, and a tubular housing connected with the stem and surrounding the lower portions of the liquid gage-indicating member and thermometer tube and provided with an opening for the entrance of liquid.

6. A combined gage and temperature indicator comprising a stem having vertically extending holes, a thermometer tube extending through one of the holes and projecting below the lower end of the stem, a temperature-indicating agent in the thermometer tube, a liquid gage-indicating member extending through the other hole and projecting below the lower end of the stem, means to fasten the stem to a radiator cap, a float on the lower end of the liquid gage-indicating member, and a tubular housing connected with the stem and surrounding the lower portions of the liquid gage-indicating member and thermometer tube and provided with an opening for the entrance of liquid, said housing being formed in relatively adjustable sections so that it can be lengthened or shortened.

7. A temperature indicator comprising a stem having a vertically extending hole enlarged at its lower end, a shield on said stem provided with a slot and with a socket at the upper end of the slot, a transparent tube extending through said hole and throughout the length of the slot and projecting into the socket, indicating means in the tube, a resilient cap on the upper end of the tube seated in the socket, means to fasten the stem to a radiator cap, packing in the enlarged portion of the hole in the stem, and means to hold the packing tightly around the tube.

8. A combined gage and temperature indicator comprising a plate having vertical slots therein, transparent tubes extending into the slots, means to mount the plate on the cap of a radiator, a temperature indicating agent in one of the tubes, a liquid gage-indicating member having its upper portion in the other tube, and a float on the lower end of the liquid gage-indicating member, there being horizontal slots in the plate communicating with the vertical slots, said horizontal slots being positioned at levels indicative of certain levels and temperatures of the water in the radiator so that said levels and temperatures can be read simultaneously.

Signed at Pasadena, California, this 4th day of June, 1918.

WILLIAM DANIAL COLLINS.

Witnesses:
 H. H. LEHMAN,
 R. T. SEGNER.